No. 844,958. PATENTED FEB. 19, 1907.
A. L. RIGGS.
STEAM TRAP.
APPLICATION FILED NOV. 2, 1906.

2 SHEETS—SHEET 1.

WITNESSES

INVENTOR
Alfred L. Riggs
BY Munn & Co
ATTORNEYS

No. 844,958. PATENTED FEB. 19, 1907.
A. L. RIGGS.
STEAM TRAP.
APPLICATION FILED NOV. 2, 1906.

2 SHEETS—SHEET 2.

WITNESSES

INVENTOR
Alfred L. Riggs
BY Munn & Co
ATTORNEYS

UNITED STATES PATENT OFFICE.

ALFRED LEANDER RIGGS, OF EBENSBURG, PENNSYLVANIA.

STEAM-TRAP.

No. 844,958.  Specification of Letters Patent.  Patented Feb. 19, 1907.

Application filed November 2, 1906. Serial No. 341,739.

*To all whom it may concern:*

Be it known that I, ALFRED LEANDER RIGGS, a citizen of the United States, and a resident of Ebensburg, in the county of Cambria and State of Pennsylvania, have invented a new and Improved Steam-Trap and Water-Meter, of which the following is a full, clear, and exact description.

This invention relates to steam-traps adapted to receive and discharge therefrom the water of condensation from a pipe or system, and has for its object to provide a trap simple in construction, inexpensive in cost, effective in operation, and durable in use, adapted to receive the water of condensation gradually and to discharge the same quickly in predetermined quantities, and also to provide means for measuring the quantity of water passing through the trap, so as to provide a water-meter as well as a trap. Such objects I accomplish by the means illustrated in the accompanying drawings, in which drawings like characters of reference indicate like parts throughout the views, and in which—

Figure 1:
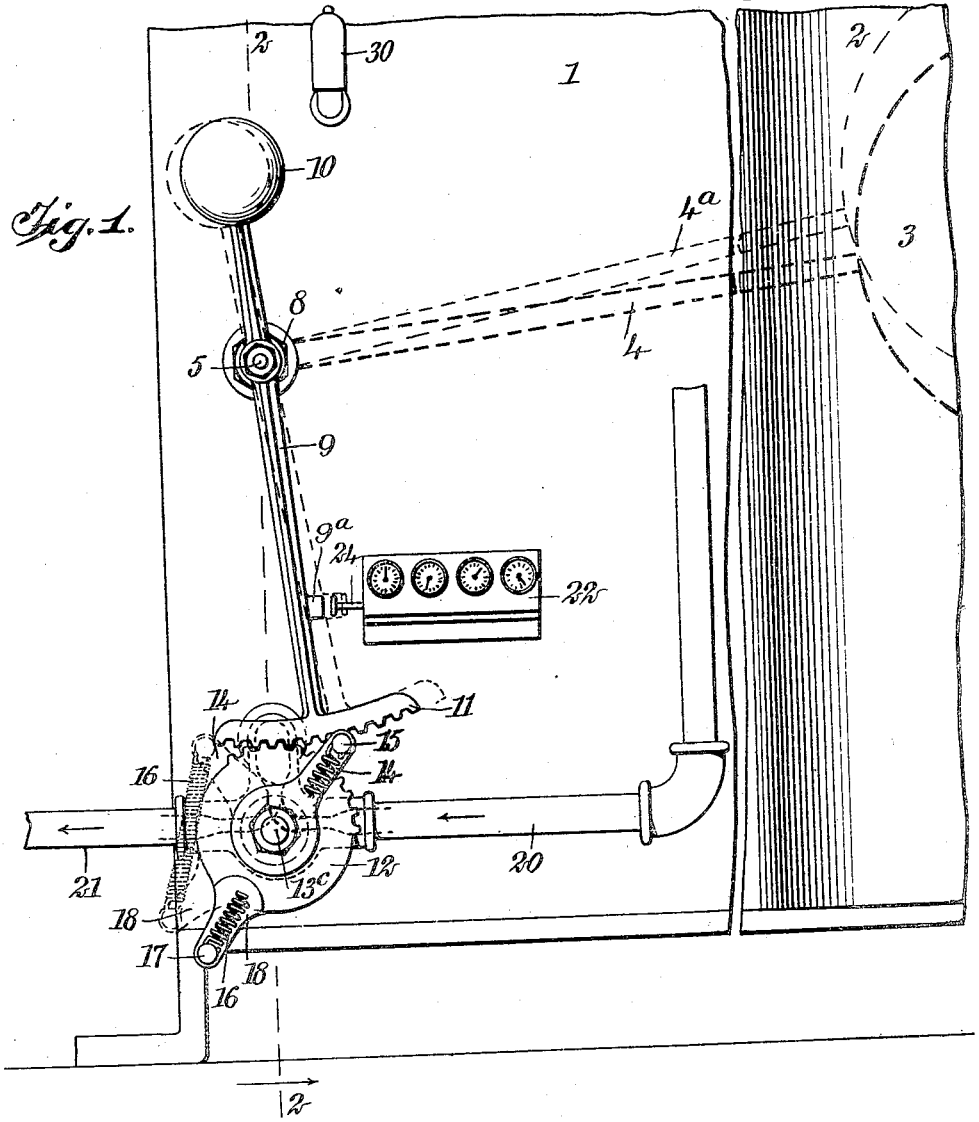
Figure 3:
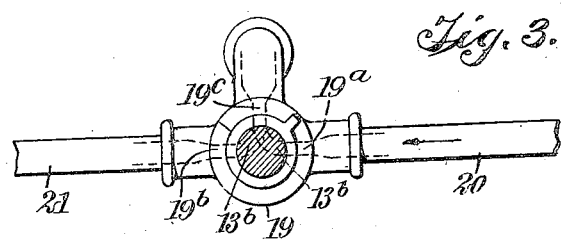
Figure 2:
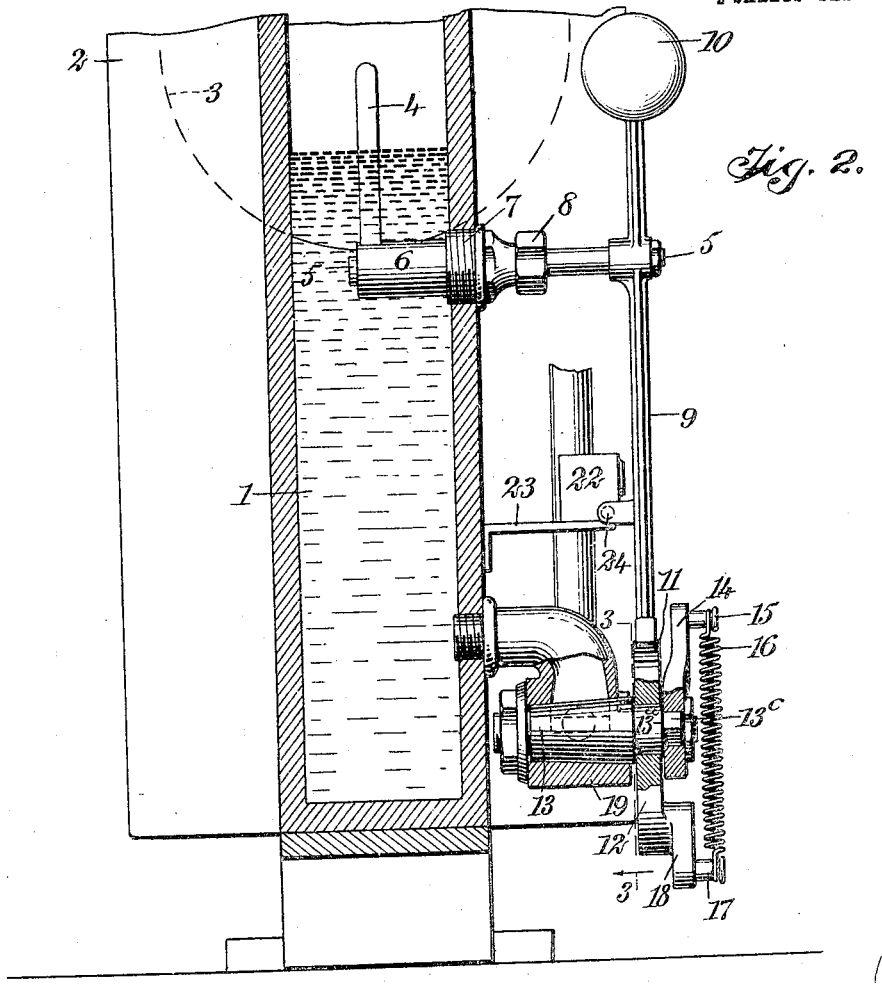
Figure 4:
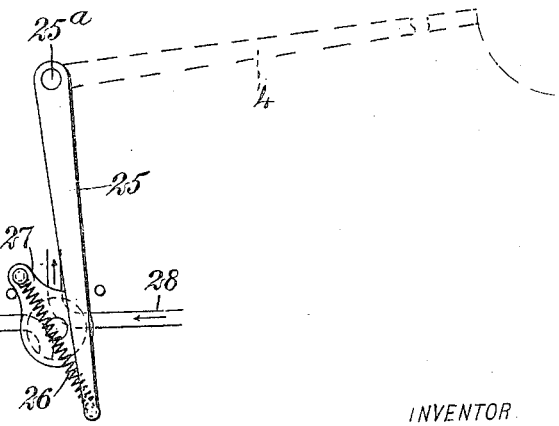

Figure 1 is a side elevation of a trap and meter embodying my invention. Fig. 2 is a vertical section taken on the line 2 2 of Fig. 1. Fig. 3 is a front elevation, partly in section, taken on the line 3 3 of Fig. 2. Fig. 4 is a side elevation of a modification of means for operating the valve.

As illustrated in the drawings, a receptacle is provided having a narrow section 1 and a cylindrical section 2 connected therewith. A float 3 is arranged within the cylindrical section 2 and is secured to an arm 4, as indicated by heavy dotted lines in Fig. 1. The arm 4 is fixedly secured to a rock-shaft 5, which is journaled within a sleeve 6, provided with an exterior thread 7 and a stuffing-box 8. The sleeve 6 is mounted on one of the walls of the receptacle by means of the threaded exterior 7 engaging corresponding threads formed in said wall. A swinging arm 9 is fixedly secured to the shaft 5 and provided on its upper end with a counterbalancing-weight 10 and on its lower end with a toothed segment 11, adapted to engage the toothed edge of a disk 12, which is loosely journaled on the hub 13ª of a valve-head 13. The valve-head 13 is provided with a stem 13ᶜ, preferably angular in outline, which supports a lever 14, fixedly secured thereto. The lever 14 is provided with a pin 15, to which is attached one end of a spring 16, the opposite end of the spring 16 being attached to a pin 17, secured to an arm 18, formed on the disk 12. The valve-head 13 is journaled in a valve-casing 19, having an inlet-pipe 20 and an outlet-pipe 21 connected therewith. The valve-casing 19 is provided with three ways 19ª, 19ᵇ, and 19ᶜ, which are adapted to register with corresponding ways 13ᵇ, formed in the valve-head 13.

When the device is in use and the water of condensation rises in the receptacle, it lifts the float 3 until the float reaches a predetermined height, (indicated by the light dotted lines 4ª in Fig. 1.) The lever 9, counterbalancing-weight 10, and segment 11 are then in the position indicated by dotted lines in Fig. 1, as are also the spring 16, the valve-arm 14, and the disk-arm 18, also shown in said figure. The passage-ways in the valve-head 13 are so arranged as to shut off the supply of water to the receptacle and open the discharge passage-way in said valve, so as to allow the water to flow out of said receptacle through said valve-head and discharge-pipe 21. As the water flows out of the receptacle the float 3 gradually descends and swings the toothed segment 11 to the left, thereby rotating the disk 12 freely on the hub 13ª of the valve-head 13. During such movement of the segment 11 and disk 12 the arm 14, fixedly secured to the valve-head 13, remains stationary. The movement of the disk 12 carries the lower end of the spring 16 around in the arc of a circle, and while so doing stretches the spring gradually until the pin 15 of the arm 14 and the pin 17 of the arm 18 are in line with the axis of the valve-head 13. As the arm 18 continues to move in its course the spring 16 passes the axis of the valve-head 13 and quickly retracts with such force as to draw the arm 14 of the valve toward the arm 18 of the disk 12, thereby rotating the valve-head 13 in its casing, closing the outlet-port of the valve, and opening the inlet-port, so as to allow the water of condensation to again fill the receptacle. When the parts are in such position, the spring 16 and the arms connected therewith are arranged in a position on the opposite side of the valve-head 13 to that indicated by dotted lines in Fig. 1. The valve is stationary in its casing while the water is filling the receptacle 1, and is turned quickly when the receptacle is filled, so as to shut off the supply of water to the tank and allow the water therein to be discharged, and the valve is also stationary. while the water is gradually passing out of the receptacle and is operated quickly when the water has passed out of the receptacle, so as to close the outlet and allow the water of condensation to again fill the receptacle. Inasmuch as an equal quantity of water passes out of the receptacle at each movement of the valve, the amount of water passing through the receptacle may be readily gaged and recorded by means of a meter 22, which, as shown in the drawings, is supported upon a bracket 23 secured to the walls of the receptacle and provided with a registering-button 24 adapted to be tapped by the lever 9 or the lug 9ª attached thereto, so as to register the number of times the valve has been operated, from which may readily be determined the amount of water passing through the receptacle.

In the construction herein shown and described I have embodied my invention in its preferred form. I do not desire to be limited to such construction, however, as my invention is generic in its character and includes other means having similar capabilities. Thus instead of using a pivoted rod 9 provided with a toothed segment adapted to engage the teeth of the disk 12, journaled upon the valve-stem, the float-rod 4 may be fixedly secured to an arm 25, pivoted at 25ª and connected at its lower end to one end of a spring 26, the opposite end of said spring being attached to an arm 27, secured to the stem of a three-way valve. As the lower end of the lever 25 carries the spring 26 past the axis of the valve the spring contracts so as to draw the arm 27 quickly toward the end of the lever 25, thereby reversing the position of the valve relatively to the inlet-pipe 28 and the outlet-pipe 29 connected thereto. It is obvious also that instead of using the three-way valve shown in the drawings two one-way valves may be used. Inasmuch as nothing but the float and the supporting-arm are arranged within the receptacle all of the operating parts are made accessible, so as to be readily inspected or repaired. Such parts may therefore be inclosed within an auxiliary casing of any suitable construction, attached to the walls of the receptacle in any suitable manner. The receptacle is also provided with an air-valve 30, preferably arranged at the top of the receptacle, which may be of the usual construction. Inasmuch as the valve opens and closes very quickly, the wire-drawing, common in the usual form of trap when only partly opened, is entirely avoided, thereby enabling the valve to last much longer and operate more satisfactorily.

Having thus described my invention, what I claim as new, and desire to secure by Letters Patent, is—

1. The combination with a receptacle, of a three-way valve provided with an arm, a float, and a spring connected with the valve-arm and operated by said float so as to rotate the valve quickly as the line of said spring passes the center of said valve.

2. The combination with a receptacle, of a three-way valve connected therewith, and provided with an arm, a float, and a spring operated by said float and connected with said valve-arm so as to spread said spring as the line of the spring passes the center of the valve, and enable said spring to contract quickly as it passes said center and rotate said valve in its casing.

3. The combination with a receptacle, of a three-way valve connected therewith, a float, and a spring connected with said float and valve, adapted to move across the axis of the valve and rotate said valve after it has passed said axis.

4. The combination with a receptacle, of a valve having a spring connected therewith, and a float connected with said spring and adapted to carry said spring past the center of said valve alternately in opposite directions.

5. The combination with a receptacle, of a valve provided with an arm, a float arranged within said receptacle, and a spring connected with said valve-arm and float so as to be carried gradually toward and past the center of said valve and rotate said valve-arm.

6. The combination with a receptacle, of a float adapted to operate therein, a valve connected with said receptacle, a spring connected with said valve and float, adapted to be drawn across the center of said valve and rotate said valve, and a registering-meter adapted to be operated by said float.

7. The combination with a receptacle, of a valve connected therewith and provided with an arm, a float arranged within said receptacle, and a spring connected with said float and valve-arm having a bodily movement transversely of the center of said valve, and a contracting movement on passing said center.

In testimony whereof I have signed my name to this specification in the presence of two subscribing witnesses.

ALFRED LEANDER RIGGS.

Witnesses:
PHILIP N. SHETTIG,
J. W. LEECH.